United States Patent [19]
Halsey et al.

[11] Patent Number: 5,788,359
[45] Date of Patent: Aug. 4, 1998

[54] LASER LIGHT PROJECTING DEVICE

[76] Inventors: Keith D. Halsey, 2824 2nd St., Santa Monica, Calif. 90405; Witold F. Siekaj, 20812 Hillside, Topanga, Calif. 90408

[21] Appl. No.: 582,518

[22] Filed: Jan. 3, 1996

[51] Int. Cl.[6] .................................................. B43K 29/10
[52] U.S. Cl. ........................... 362/118; 362/109; 362/259
[58] Field of Search ............................... 362/109, 118, 362/187, 208, 259, 277, 280, 319

[56] References Cited

U.S. PATENT DOCUMENTS

| | | | |
|---|---|---|---|
| 1,263,234 | 4/1918 | Hanson | 362/277 |
| 2,957,389 | 10/1960 | Moore | 362/109 |
| 2,979,602 | 4/1961 | Barnett | 240/6.46 |
| 3,657,510 | 4/1972 | Rothrock | 219/121 |
| 4,916,579 | 4/1990 | Simms | 362/18 |
| 5,268,829 | 12/1993 | Lo | 362/259 |
| 5,446,635 | 8/1995 | Jehn | 362/259 |
| 5,450,148 | 9/1995 | Shu et al. | 362/259 |

*Primary Examiner*—Y. My Quach
*Attorney, Agent, or Firm*—Aquilino & Welsh

[57] ABSTRACT

A light projecting device for selectively providing a light beam in at least two shapes. The light projecting device includes a light projecting source contained within a housing including a first end through which the light projecting source transmits a light beam. The device further includes a lens switch secured to the first end of the housing permitting the light beam to pass through a primary opening in the lens switch, while the lens switch controls the shape of the light beam projected from the light projecting device. The lens switch includes a first opening through which the light beam passes when the lens switch is in a first position to produce a first shaped light beam, a second opening through which the light beam passes when the lens switch is in a second position to produce a second shaped light beam, and a switching structure for selectively moving the first opening and the second opening between the first position and the second position to align the first opening and the second opening with the primary opening.

14 Claims, 3 Drawing Sheets

LASER LIGHT PROJECTING DEVICE

BACKGROUND OF THE INVENTION

1. Field of the Invention

The invention relates to light projecting devices. More particularly, to laser light projecting devices providing an individual the ability to switch between a dot shaped light beam and a line shaped light beam, or any other shape desired by an individual.

2. Description of the Prior Art

Light beams have been used for some time to draw attention to particular objects. For example, spotlights are used to illuminate a wide variety of exhibits or to draw attention to certain landmarks. Similarly, flashlights are often used to shed light on objects that, because of darkness, cannot be seen or require additional light for detailed study.

The development of pen sized laser lights capable of producing a very focused, but substantially harmless, beam of light now permits individuals to direct peoples' attention to objects by simply pointing the laser beam on the object the individual considers important. These pen sized laser lights have found particular usefulness during presentations where the viewers' attention must be directed to various exhibits relevant to the presentation. In fact, pen sized laser lights have all but replaced conventional telescopic pointers.

However, as anyone who has sat through a presentation where a laser light is being used knows, the small point of light created by the laser light is often difficult to follow as a presenter moves it about the exhibits. In addition, the point of light limits the presenter's ability to highlight the exhibits or material he or she considers important. These limitations are often frustrating to presenters and viewers, although the laser lights are a vast improvement over the telescopic pointers previously used.

A need, therefore, exists for a pen sized laser light providing presenters with the ability to more effectively draw viewers attention to exhibits or material he or she considers important. The present invention provides such a light source.

SUMMARY OF THE INVENTION

It is, therefore, an object of the present invention to provide a light projecting device for selectively providing a light beam in at least two shapes. The light projecting device includes a light projecting source contained within a housing having a first end through which the light projecting source transmits a light beam. The device further includes a lens switch secured to the first end of the housing permitting the light beam to pass through a primary opening in the lens switch, while the lens switch controls the shape of the light beam projected from the light projecting device. The lens switch includes a first opening through which the light beam passes when the lens switch is in a first position to produce a first shaped light beam, a second opening through which the light beam passes when the lens switch is in a second position to produce a second shaped light beam, and means for selectively moving the first opening and the second opening between the first position and the second position to align the first opening and the second opening with the primary opening.

It is also an object of the present invention to provide a light projecting device wherein the light projecting source emits a point shaped laser beam.

It is another object of the present invention to provide a light projecting device wherein the first opening does not modify the shape of the laser beam emitted from the light projecting source and a point shaped beam is projected by the light projecting device.

It is a further object of the present invention to provide a light projecting device wherein the second opening includes a lens which changes the point shaped laser beam emitted from light projecting source into a line shaped beam.

It is also an object of the present invention to provide a light projecting device wherein the means for selectively moving includes a switching structure supporting the first opening and the second opening for selectively aligning the first opening and the second opening with the primary opening.

It is another object of the present invention to provide a lens switch for permitting an individual to selectively control the shape of a light beam projected from a light projecting source. The lens switch includes a lens case adapted to be secured to a light projecting source to permit a light beam to pass through a primary opening in the lens case. The lens switch further includes a first opening and a second opening housed within the lens case such that the first opening and the second opening may be selectively aligned with the primary opening. In use, the light beam passes through the first opening when the lens switch is in a first position to produce a first shaped light beam and the light beam passes through the second opening when the lens switch is in a second position to produce a second shaped light beam. The lens switch is further provided with means for selectively moving the first opening and the second opening between the first position and the second position to align the first opening and the second opening with the primary opening.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
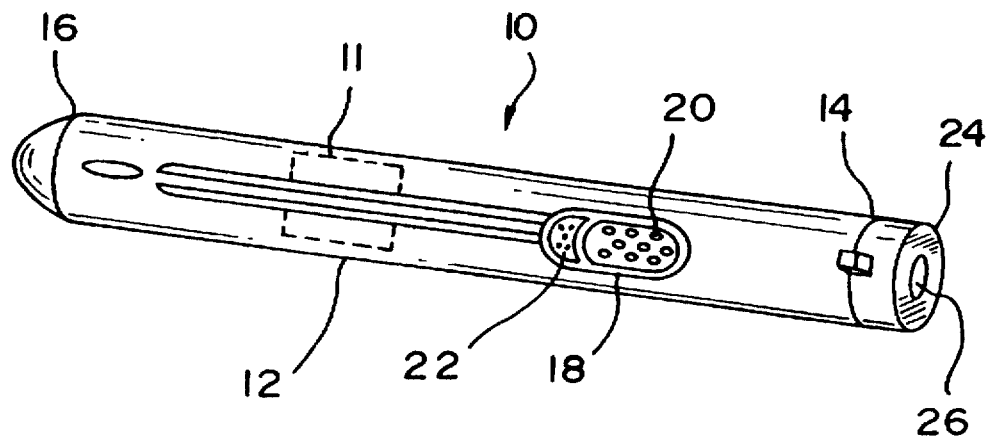
FIG. 1 is a perspective view of the light projecting device.

With reference to FIG. 1, a laser light projecting device 10 for selectively providing a light beam in at least two shapes is disclosed. The laser light projecting device 10 includes a light projecting source 11 contained within a housing 12. The housing 12 includes a first end 14 through which the light projecting source 11 transmits a light beam. In accordance with the disclosed embodiment, the light projecting source 11 emits a point shaped laser beam visible to the human eye and of limited danger to those individuals that might come into contact with the laser beam. While the disclosed embodiment utilizes a laser beam, other light projecting sources could be utilized without departing from the spirit of the present invention.

The housing 12 is preferably pen shaped and is designed to fit comfortably within the palm of a user. As stated above, the housing 12 includes a first end 14 which is open, permitting the laser beam to pass therethrough. The light projecting source 11 is positioned within the housing 12 and is securely held in position between the second closed end 16 of the housing and the open first end 14.

An on/off switch 18 is provided on the outer surface of the housing 12 for selectively actuating the light projecting source 11. The on/off switch 18 only actuates the light projecting source 11 when an individual presses the on/off switch 18. This prevents a user from accidentally forgetting to turn the laser beam off. The on/off switch 18 is provided with a first button 20 which activates the light projecting source 11 to provide a continuous laser beam and a second button 22 which activates the light source to provide a blinking laser beam.

Figure 2:
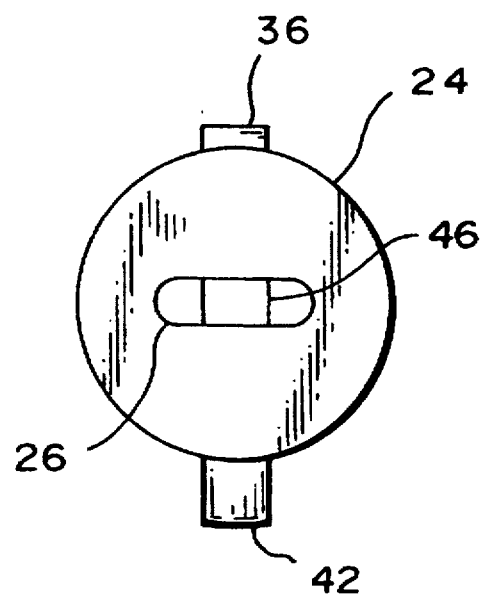
FIG. 2 is a front view of the light projecting device.
Figure 3:
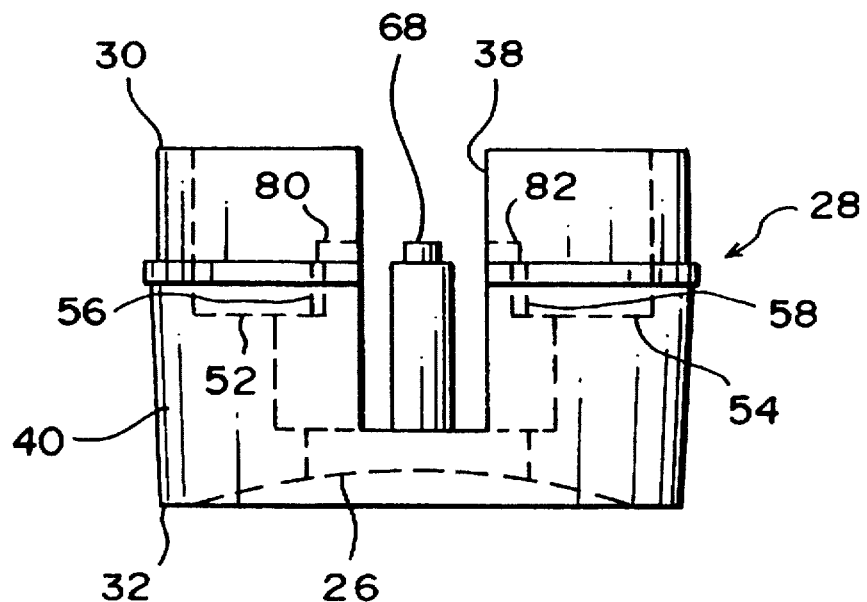
FIG. 3 is a side view of the lens case of the lens switch.
Figure 7:
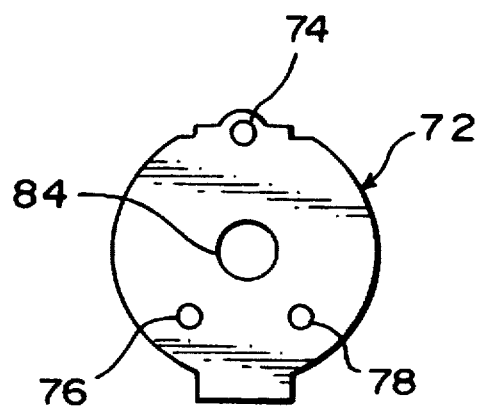
FIG. 7 is a top view of the end plate of the lens switch.

With reference to FIGS. 1 and 2, a lens switch 24 is secured to the first end 14 of the housing 12 permitting the laser beam to pass through a primary opening 26 in the lens switch 24. The lens switch 24 is designed to control the shape of the laser beam projected from the laser light projecting device 10. While the lens switch 24 is disclosed as being permanently secured to the first end 14 of the housing 12, the lens switch 24 could be releasably secured to the first end 14 without departing from the spirit of the present invention.

As shown in FIGS. 3–7, the lens switch 24 includes a cylindrical shaped lens case 28 having an outer diameter that is approximately the same as the diameter of the housing 12. The lens case 28 includes a first end 30 with a slightly reduced diameter permitting the first end 30 of the lens case 28 to fit within the first end 14 of the housing 12. That is, the first end 30 of the lens case 28 has an outer diameter which is slightly smaller than the inner diameter of the housing 12 permitting the first end 30 of the lens case 28 to be secured within the first end 14 of the housing 12. The first end 30 of the lens case 28 is permanently held within the first end 14 of the housing 12 by conventional bonding techniques. The lens case 28 also includes a second end 32 having a primary opening 26 through which the laser beam ultimately passes when the light projecting source 11 is activated.

Figure 4:
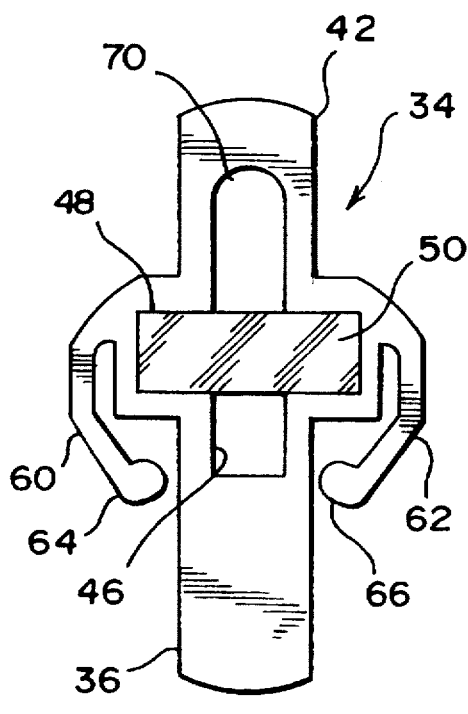
FIG. 4 is a top view of the switching structure of the lens switch.
Figure 5:
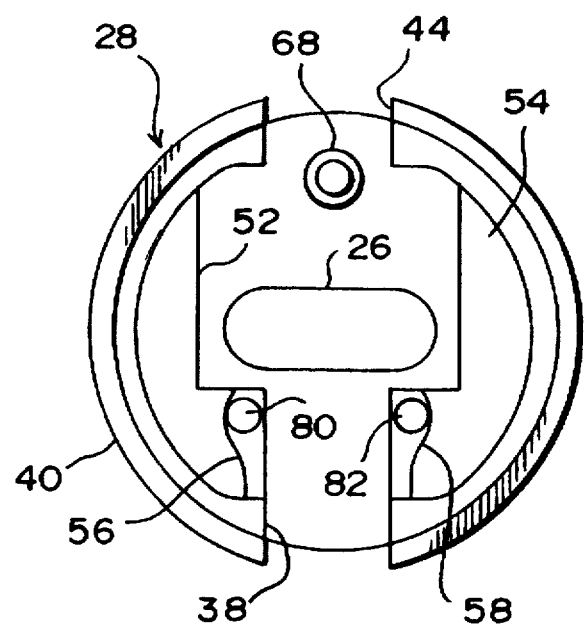
FIG. 5 is a top view of the lens case of the lens switch.
Figure 6:
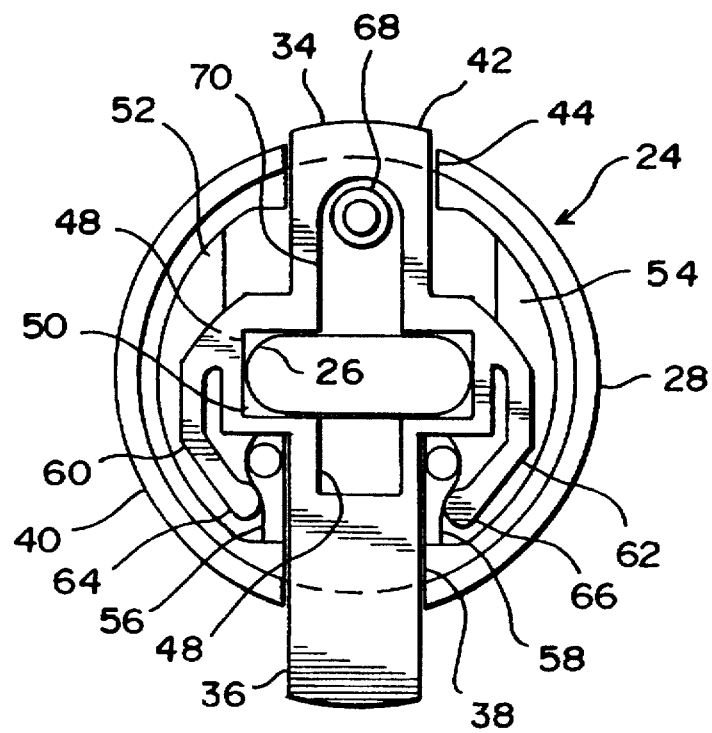
FIG. 6 is a top view of the lens switch showing the switching structure positioned within the lens case.

The lens switch 24 also includes a switching structure 34 that is shown in FIGS. 4 and 6. The switching structure 34 is held within the lens case 28 such that the switching structure 34 can be moved between a first position and a second position. The switching structuring 34 is, therefore, provided with a first outwardly extending arm 36 held within a first slide opening 38 in the outer wall 40 of the lens case 28 and a second outwardly extending arm 42 held within a second slide opening 44 in the outer wall 40 of the lens case 28. The first arm 36 and the first slide opening 38 are diametrically opposed to the second arm 42 and second slide opening 44 such that the switching structure 34 can be moved between a first position and a second position by selectively pushing the first arm or the second arm.

The switching structure 34 further includes a first opening 46 through which the light beam passes when the switching structure 34 of the lens switch 24 is in the first position (shown in FIG. 2) and a second opening 48 through which the light beam passes when the switching structure 34 of the lens switch 24 is in the second position (shown in FIG. 6). That is, the switching structure 34 is in the first position when the first opening 46 is aligned with the primary opening 26 such that the laser beam passes through the first opening 46 and the primary opening 26 when the laser beam is emitted by the light projecting source 11. Similarly, the switching structure 34 is in the second position when the second opening 48 is aligned with the primary opening 26 such that the laser beam passes through the second opening 48 and the primary opening 26 when the laser beam is emitted by the light projecting source 11.

With reference to FIG. 4, the first opening 46 is simply a square shaped outline which does not alter the shape of the laser beam projecting from the light projecting source 11. The second opening 48 is rectangular shaped and includes a cylindrical lens 50 shaped to change the point shaped laser beam emitted by the light projecting source 11 into a short elongated line. As a result, an individual may switch between the use of a conventional point shaped laser beam (first position) and a short elongated line shaped laser beam (second position). While the preferred embodiment is disclosed as utilizing a cylindrical lens, the lens could be replaced with a diffractive optic, or any other lens capable of converting a point shaped beam into a line, without departing from the spirit of the present invention. It should also be understood that while the disclosed embodiment provides a point shaped laser and a line shaped laser beam, a variety of shapes could be provided without departing from the spirit of the present invention. In addition, the switching structure could be modified to provide more than two shapes without departing from the spirit of the present invention.

Positioning of the switching structure 34 within the lens case 28 is further enhanced by the provision of first and second ledge surfaces 52, 54 within the lens case 28. The ledge surfaces 52, 54 are designed to support the switching structure 34 while it is positioned within the lens case 28. First and second camming surfaces 56, 58 are provided on the opposed ledge surfaces 52, 54 and respectively interact with first and second extending spring arms 60, 62 on the switching structure 34 to hold the switching structure 34 in position as it is moved between the first and second positions. Specifically, the distal ends 64, 66 of the first and second extending arms 60, 62 interact with the first and second camming surfaces 56, 58 such that the switching structure 34 is held in either the first position or the second position. As shown in FIG. 6, the switching structure is held in its second position, but could be moved to the first position by applying pressure to arm 36.

Movement of the switching structure 34 within the lens case 28 is further controlled by an upstanding first post 68 that fits within an oblong opening 70 in the switching structure 34 to prevent lateral movement of the switching structure 34 and limit the sliding of the switching structure 34 between the first and second positions. The lens switch 24 is also provided with an end plate 72 (FIG. 7) that is secured to the lens case to hold the switching structure 34 therein. The end plate 72 is screwed to the lens case with screws (not shown) respectively passing through first, second and third openings 74, 76, 78 in the end plate 72 and into first, second and third posts 68, 80, 82 in the lens case. The end plate also includes a central opening 84 through which the light beam may pass.

While the preferred embodiment has been shown and described, it will be understood that there is no intent to limit the invention by such disclosure, but rather, is intended to cover all modifications and alternate constructions falling within the spirit and scope of the invention as defined in the appended claims.

We claim:

1. A light projecting device for selectively providing a light beam in at least two shapes, comprising:

a light projecting source contained within a housing, the housing including a first end through which the light projecting source transmits a point shaped light beam;

a lens switch secured to the first end of the housing permitting the light beam to pass through a primary opening in the lens switch, the lens switch including:

a lens case secured to the first end of the housing permiting the point shaped light beam to pass through the primary opening in the lens switch;

a switching structure supported within the lens case for moving between a first position and a second position, the switching structure including a first opening and a second opening wherein the first opening and the second opening may be selectively aligned with the primary opening such that the point shaped light beam passes through the first opening when the switching structure is in a first position to produce a first shaped light beam and the point shaped light beam passes through the second opening when the switching structure is in a second position to produce a second shaped light beam; and means associated with the switching structure for selectively moving the switching structure between the first position and the second position to align the first opening and the second opening with the primary opening.

2. The light projecting device according to claim 1, wherein the point shaped light beam is a point shaped laser beam projected by the light projecting source and the first opening does not modify the shape of the point shaped laser beam emitted from the light projecting source.

3. The light projecting device according to claim 2, wherein the second opening includes a lens which changes the point shaped laser beam emitted from the light projecting source into a line shaped beam.

4. The light projecting device according to claim 1, wherein the first opening does not modify the shape of the point shaped light beam emitted from the light projecting source.

5. The light projecting device according to claim 4, wherein the second opening includes a lens which changes the point shaped light beam emitted from the light projecting source into a line shaped light beam.

6. The light projecting device according to claim 1, wherein the second opening includes a lens which changes the point shaped light beam emitted from light projecting source into a line shaped light beam.

7. The light projecting device according to claim 1, wherein the means for selectively moving includes a pair of arms actuating the switching structure between the first position and the second position.

8. A lens switch for permitting an individual to selectively control a shape of a light beam projected from a light projecting source contained within a housing, wherein the lens switch is configured to be secured to a first end of the housing, the lens switch comprising:

a lens case configured to be secured to the first end of the housing and permiting a light beam to pass through a primary opening in the lens case, and the light projecting source emits a point shaped light beam;

a switching structure supported within the lens case moving between a first position and a second position, the switching structure including a first opening and a second opening wherein the first opening and the second opening may be selectively aligned with the primary opening such that the point shaped light beam passes through the first opening when the switching structure is in a first position to produce a first shaped light beam and the point shaped light beam passes through the second opening when the switching structure is in a second position to produce a second shaped light beam; and means associated with the switching structure for selectively moving the switching structure between the first position and the second position to align the first opening and the second opening with the primary opening.

9. The lens switch according to claim 8, wherein the point shaped light beam is a point shaped laser beam projected by the light projecting source and the first opening does not modify the shape of the point shaped laser beam emitted from the light projecting source.

10. The lens switch according to claim 9, wherein the second opening includes a lens which changes the point shaped laser beam emitted from light projecting source into a line shaped laser beam.

11. The lens switch according to claim 8, wherein the first opening does not modify the shape of the point shaped light beam emitted from the light projecting source.

12. The lens switch according to claim 11, wherein the second opening includes a lens which changes the point shaped light beam emitted from light projecting source into a line shaped light beam.

13. The lens switch according to claim 8, wherein the second opening includes a lens which changes the point shaped light beam emitted from light projecting source into a line shaped light beam.

14. The lens switch according to claim 8, wherein the means for selectively moving includes a pair of arms actuating the switching structure between the first position and the second position.

* * * * *